United States Patent Office 3,004,020
Patented Oct. 10, 1961

3,004,020
ETHYLENE POLYMERIZATION USING A MIXTURE OF METALS AND A HALOGEN AS CATALYST
Howard S. Young, Charles W. Hargis, and Wayne Reynolds, Kingsport, Tenn., assignors to Eastman Kodak Company, Rochester, N.Y., a corporation of New Jersey
No Drawing. Filed Mar. 31, 1958, Ser. No. 724,903
7 Claims. (Cl. 260—94.9)

This invention relates to the catalytic polymerization of normally gaseous α-monoolefins to high molecular weight, highly crystalline solid polymers. In a particular aspect this invention is concerned with the polymerization of ethylene thereof to form solid high density, highly crystalline polymers.

For many years, the Friedel-Crafts type catalysts, such as aluminum chloride and boron trifluoride, were used to polymerize olefins to form low molecular weight, liquid polymers. Until recently, the commercial production of solid polyethylene was limited to the extremely high pressure process disclosed by Fawcett et al. in U.S. 2,153,553 wherein it was disclosed that ethylene could be polymerized to a solid waxy polymer by the use of pressures in excess of 500 atmospheres and usually of the order of 1000–2000 atmospheres. This high pressure polyethylene was characterized by a high degree of flexibility, good film forming properties and a waxy feel. Since such high pressure polyethylene possesses a rather high degree of chain branching, however, it also exhibits a relatively low softening temperature, a low density, and relatively low crystallinity.

An early attempt to employ aluminum metal in combination with alumnium chloride as catalyst for ethylene polymerization was disclosed by Hall and Nash (J. Inst. Petroleum Tech., 23, 679–87 (1937)), but it was found that, as with aluminum chloride alone, only low molecular weight oils were formed. Kraus (U.S. 2,220,930) found that high molecular weight olefin polymers could be produce using alkyl metal halides wherein the metal was aluminum, gallium or boron. Some years later Field et al. (U.S. 2,691,647) discovered that solid polymers could be prepared by polymerizing ethylene in the presence of a catalytic mixture consisting of a supported oxide of chromium, molybdenum, tungsten or uranium activated by an alkali metal. At about the same time, Ziegler et al. (U.S. 2,699,457) discovered that metal alkyls could be used to form low molecular weight polymers with ethylene or similar olefins. Thereafter, Ziegler found that the metal alkyls or metal alkyl halides such as aluminum triethyl or ethyl aluminum chloride in combination with a compound of a metal from the 4th to the 6th subgroups of the periodic table gave high molecular weight solid polymers which were characterized, as were the Field et al. polymers, by a high density, high crystallinity, improved melting point, and relatively greater rigidity than is characteristic of the high pressure polymers.

Thus, at the present time, the catalytic processes for preparing highly crystalline, high molecular weight solid polyethylene fall into two general categories, namely, those employing a metal oxide as catalyst and those employing a metal alkyl or alkyl metal halide together with an activator. The metal oxide catalysts are used on solid supports as a catalyst bed and are subject to plugging of the bed and coating and inactivation of the catalyst unless special precautions are taken to ensure solution of the polymer as it is formed. The metal alkyls and metal alkyl halides are expensive to prepare and are difficult to handle in commercial practice due to the fact that they ignite spontaneously on contact with air. It is therefore desirable to have a simple and inexpensive catalyst system whereby ethylene and similar gaseous α-monoolefins can be converted to high molecular weight solid polymer at relatively low pressures and temperatures without incurring the difficulties encountered in the use of prior art catalysts.

It is accordingly an object of this invention to provide a new and improved process for effecting conversion of normally gaseous α-monoolefins, to high molecular weight, highly crystalline solid polymers. Another object of the invention is to provide a new and improved process for catalytic polymerization of ethylene to high density solid polymers employing simple combinations of readily available, inexpensive catalytic components which are free of the objectionable handling problems characteristic of the pyrophoric catalysts heretofore employed. Another object of the invention is to facilitate the commercial manufacture of high density, highly crystalline ethylene polymers by providing an economical process which can be readily carried out at pressures as low as atmospheric and at temperatures ranging from 0° C. to 250° C. Another object of the invention is to provide a catalyst mixture for forming solid polyethylene and containing only components which have not been known to possess any utility for polymerizing ethylene even to low molecular weight polymers. Other objects will be apparent from the description and claims which follow.

These and other objects are attained by means of this invention wherein it was found unexpectedly that the normally gaseous α-monoolefins, particularly ethylene could be converted to high molecular weight, highly crystalline solid polymers by effecting the polymerization in the presence of a catalytic mixture containing a transition metal selected from the group consisting of titanium, zirconium, vanadium, chromium and molybdenum, a second metal selected from the group consisting of aluminum, zinc and magnesium, and a halogen selected from the group consisting of chlorine, bromine and iodine. It has now been found that this simple combination of catalytic components which in themselves possess no utility for polymerizing olefins to yield low or high molecular weight liquid or solid polymers can be used to produce solid polymers of improved crystallinity, melting point, and rigidity. Furthermore, the catalyst components are readily available and are simple to handle in large scale manufacturing operations. Insofar as is known, the various metals used in this catalyst composition have not been recognized as having any utility in the polymerization of olefins. Furthermore, the halogen components of the catalyst combination have not themselves been known to possess properties suitable for use as polymerization catalysts. The reason why this mixture exhibits catalytic activity is not readily understood and could not be predicted from the art wherein it is apparent that the catalytic activity is empirical and unpredictable. An especially advantageous feature of this catalyst composition is that by procedural variations in introducing the components of the catalyst to the polymerization it is possible to control the rate of reaction and the type of polymer formed in the reaction.

The various components of this catalyst mixture are individually ineffective as catalysts for polymerization of olefins even to form liquid polymers. When the components are employed in combination, however, the apparently synergistic mixture possesses a high degree of activity at temperatures as low as room temperature or lower and at pressures as low as atmospheric pressure. The relative proportions of the components can be varied quite widely, although best results are obtained when from 0.1 to 10 atoms of second metal per atom of transition metal and from 0.1 to 10 atoms of transition metal per mole of halogen are used. Other concentrations of the catalyst components can be used, but usually ratios of components outside the expressed ranges are unnecessary and undesirable from a commercial viewpoint.

The inventive process is carried out in liquid phase in an inert organic liquid, and preferably an inert liquid hydrocarbon vehicle, and the removal of catalyst is facilitated by operating below the melting point of the polymer. The process gives excellent results over a relatively wide temperature range with temperatures of 0° C. to 250° C. being preferably employed, and particularly good results being obtained in the range of 25° C. to 175° C. The pressure can be varied as desired, with pressures as low as atmospheric pressure being operable. Generally speaking, however, it is desirable to employ a pressure in the range of 0–1000 p.s.i.g. with pressures of from 10 to 1000 p.s.i.g. being preferred for optimum yields. In some cases, higher pressures such as are employed in the conventional high pressure processes can be used but are usually not necessary. Thus, pressures of as much as 20,000 p.s.i.g. or higher can be used in some instances. The liquid vehicle employed is desirably one which serves as an inert liquid medium in the polymerization reaction. The great increase in polymerization rate with increasing pressures makes the use of pressures of 300–1000 p.s.i. desirable.

The invention can be used for polymerizing any of the well known α-monoolefinic hydrocarbons and preferably those containing from 2 to 10 carbon atoms, and the invention is particularly applicable for polymerizing ethylene. When ethylene is employed as the monomer, the polyethylene obtained has a softening point or fusion point greater than 120° C. which means that products prepared therefrom can be readily employed in contact with boiling water without deformation or other deleterious results. The polymers embodying this invention have molecular weights greater than 1000 and usually greater than 10,000. The achievement of extremely high molecular weights does not present a problem employing the catalytic process herein described, and molecular weights even greater than 1,000,000 can be readily attained. The high molecular weight, high density polyethylenes of this invention are insoluble in solvents at ordinary temperatures but they are soluble in such solvents as xylene, toluene or tetralin at temperatures above 100° C. With the exception of the compounds of extremely high molecular weight, the polyethylenes obtained according to this invention are soluble in tetralin at 145° C. These solubility characteristics make it possible to carry out the polymerization process under conditions wherein a polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosities as measured in tetralin at 145° C. may be varied from about 0.5 or lower to 5.0 or higher. Melt indices as measured by the standard ASTM method may be varied from about 0.01 to 100 or even higher.

Thus, polyethylene prepared by means of this invention and having a molecular weight in the range of 50,000 exhibits a density above 0.95, a softening temperature of at least 130° C., a tensile strength of 3000–5500 p.s.i. and a stiffness in flexure at 5% deflection (ASTM test D747-50) of at least 50,000 p.s.i.

The polyethylene prepared in accordance with the invention can be molded or extruded into flexible plates or films. The products can be extruded into the form of pipe or tubing of greater rigidity than the usual high pressure polyethylene or can be injection molded into a great variety of articles. The polymers can also be cold drawn into ribbons, bands, fibers or filaments of high elasticity and rigidity. Fibers of high strength can be spun from the molten polyethylene obtained according to this process. The process of the invention can also be employed to effect the copolymerization of ethylene with other polymerizable α-monoolefins and particularly with propylene. Other monoolefins which are suitably employed in admixtures with ethylene include such materials as n-butylene, isobutylene, 1-pentene, 1-decene, and similar α-monoolefins. In some cases, it is desirable to prepare such copolymers in order to modify the properties for particular uses such as in molding or extrusion applications. Thus, copolymers of 5–95% ethylene with 95–5% propylene are desirably prepared in many cases.

The catalyst mixtures embodying this invention have several important advantages over the prior art processes. For example, the rate of polymerization can be readily altered by procedural variations making it possible to control the polymerization reaction and the type of polymer formed with unexpected ease. Another advantage of the invention is that relatively lower pressures can be used with pressures as low as atmospheric pressure being operable. Ordinarily, moderate pressures of the order of 10–1000 p.s.i.g. are employed, but the use of such pressures still allows considerable economy over the conventional high pressure processes which operate in the range 1000–2000 atmospheres in most cases. Another advantage of the catalysts embodying this invention is the fact that they are relatively cheap and safe to handle and can be used at lower concentration than most catalysts. Thus, the aluminum alkyls which have been proposed as catalysts burn spontaneously on contact with air and require elaborate precautions for safe handling. In contrast to this, the catalyst components embodying this invention are readily available and can be handled safely in large scale practice.

The polymerization embodying the invention can be carried out batchwise or in a continuous flowing stream process. The continuous processes are preferred for economic reasons, and particularly good results are obtained using a continuous process wherein a polymerization mixture of constant composition is continuously and progressively introduced into the polymerization zone, and the mixture resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared by batch processes. The ethylene or other α-monoolefin can be charged to the polymerization mixture either as a pure material or in admixture with other materials such as hydrogen and hydrocarbons such as methane, ethane or propane. Ordinarily, relatively pure monomers are employed unless copolymers are desired. When the charged mixture consists of two or more olefins, the product consists of a true copolymer of the monomers rather than a mixture of homopolymers.

Although temperatures ranging from 0° C. to 250° C. can be employed as desired, the usual process adapted for commercial production is carried out at a temperature in the range of from 25° C. to 175° C. for best results. In the preparation of the uniform polymers by the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 10 to 1000 p.s.i.g. obtained by pressuring the system with the monomer being polymerized. The amount of vehicle employed can be varied over rather wide limits with relation to the monomer and catalyst mixture. Best results are obtained using a concentration of catalyst of from about 0.01 to about 10% and desirably 0.1 to 5% by weight in the vehicle. The preferred range is 0.1–2%. The concentration of the monomer in the vehicle will vary rather widely depending upon the reaction conditions and will usually range from about 2 to 50% by weight. For a solution type of process it is preferred to use concentrations from about 2 to about 10% by weight based on the weight of the vehicle, and for a slurry type of process higher concentrations, for example up to 40% and higher are preferred. Higher concentrations of monomer ordinarily increase the rate of polymerization, but concentrations above 5–10% by weight in a solution process are ordinarily less desirable because the polymer dissolved in the reaction medium results in a very viscous solution. The polymerization time can be varied as desired from a period of a few minutes or hours to several days. When a continuous process is employed, the contact time in the polymerization zone can also be regulated as desired and in some cases it is not necessary to employ reaction or contact times much beyond one-half to one hour since a cyclic system can be employed involving precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-octane, isooctane, methyl cyclohexane, tetralin, decalin, and any of the other well known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The catalysts embodying the invention can be used in the absence of solvent, but it is desirable to employ an anhydrous liquid vehicle for purposes of ready temperature control. The catalyst concentration is also preferably maintained in the range of from about 0.1% to about 3% for ready temperature control. When it is desired to effect the polymerization at room temperature or below, it is preferable to first heat the catalyst mixture either in the absence or presence of ethylene for a short time in order to achieve more rapid polymerization rates at such lower temperatures. A temperature of 50° C. or higher is usually sufficient for such pretreatment of the catalyst.

The polymers obtained in accordance with this invention can be extruded, mechanically milled, cast or molded as desired. The polymers are sometimes particularly valuable as blending agents with the realtively more flexible high pressure polyethylenes to give any desired combination of properties. The polymers can also be blended with antioxidants, stabilizers, plasticizers, fillers, pigments and the like or mixed with other polymeric materials, waxes and the like. In general, aside from the relatively higher values for properties such as softening point, density, stiffness and the like, the polymers embodying this invention can be treated in similar manner to those obtained by other processes.

The halogen that is employed in this catalyst mixture is selected from the group consisting of chlorine, bromine and iodine. The halogens can be used alone or in admixture with one or more of the other halogens. Also it is possible to employ these halogens in the form of an interhalogen, and the term halogen is intended to include interhalogens. Typical examples of the interhalogens that can be used are iodine monochloride and iodine monobromide. It is also possible to employ any of the halogens in admixture with an interhalogen.

By procedural variations it is possible to adjust or vary the polymerization reaction rate as well as the character of the polymer formed in the reaction. For example, one method of carrying out the polymerization reaction in accordance with this invention involves the mixing of the transition metal and the second metal preferably in the polymerization reactor. The halogen or interhalogen can be added to the reactor at this time, and, when this method of addition of catalysts is followed, an immediate vigorous reaction between the various components of the catalyst occurs. The vigor of the reaction can be controlled by addition of the solvent since the solvent tends to quench the reaction and to control the degree of reaction prior to polymerization. If the catalyst components are mixed in an ethylene atmosphere, the reaction is instantaneous, and in an inert atmosphere, such as under a nitrogen blanket, the reaction proceeds more slowly and an induction period may be needed. Alternatively, the two metal components of the catalyst composition can be admixed in the reactor in the presence of the diluent or solvent vehicle. Subsequently, the halogen is added to the reactor and when the olefin is introduced to the reactor, the polymerization reaction proceeds slowly and in a controllable manner. When the components of the catalyst composition are mixed in the reactor it is preferred to carry out the mixing in an inert atmosphere such as in a reactor that has been flushed with nitrogen or other inert gas.

The various metals that are employed in the catalyst mixture are preferably in a finely-divided form, for example, in the form of a powder. However, it will be realized that the metals can be in any desired form and in some instances it is desirable to employ the metals for the catalyst mixture in the form of an alloy.

In carrying out the polymerization process in accordance with this invention it is desirable to form a mixture of the various metals in a finely-divided form in a pressure reactor containing an inert atmosphere such as dry, oxygen-free nitrogen. The mixture of metals is then covered with a suitable solvent or diluent and the halogen or interhalogen is then added to the reactor. The reactor and its contents are then attached to a source of ethylene which is permitted to pass into the reactor provided with agitating means. After a suitable reaction period the polymer is removed from the reactor and washed with a lower aliphatic alcohol such as methanol which in some instances may contain a small amount of hydrochloric acid and then with water.

The following examples are illustrative of this invention.

*Example 1*

A 500-ml. pressure bottle containing oxygen-free dry nitrogen is loaded with a mixture of finely divided metals consisting of chromium (0.2 g.) and zinc (0.3 g.). The mixture is covered with n-heptane (100 ml.) and iodine (4.3 g.) is added. The bottle and contents are attached to a source of ethylene and agitated for 6 hours at 165° C. and 300 p.s.i. ethylene pressure. The solid polyethylene which is isolated weighs 10 g. The material melts at 127° C. and has a density of 0.958 g. per ml.

*Example 2*

A 500-ml. pressure bottle containing gaseous ethylene is loaded with finely divided aluminum-titanium alloy which is 50 percent by weight of each metal. A mass of 1.0 g. of iodine monochloride is added and vigorous reaction immediately ensues. After the reaction has subsided, the mixture is covered with 100 ml. of n-hexane. The bottle and contents are attached to a source of ethylene and agitated for 6 hours at room temperature and 30 p.s.i. ethylene pressure. The solid polymer is processed by washing with methanol containing a little hydrochloric acid and then with water, yielding 19.5 g. of product melting at 129° C. and having a density of 0.964.

*Example 3*

A 500-ml. pressure bottle containing oxygen-free dry nitrogen is loaded with a mixture of finely divided metals consisting of zirconium (0.4 g.) and aluminum (0.1 g.). The mixture is covered with 100 ml. of Stoddard solvent and bromine (1.9 g.) is added. The bottle and contents are connected to a source of ethylene and agitated for 6 hours at 75° C. and 30 p.s.i. ethylene pressure. The solid polyethylene weighs 21 g. after washing and drying. The product has a M.P. of 129° C. and a density of 0.961.

*Example 4*

Example 3 is repeated except vanadium (0.2 g.) is substituted for zirconium and iodine monochloride (2.0 g.) is substituted for bromine. The yield of solid polyethylene, M.P. 128° C. and density 0.963, is 14.5 g. after washing and drying.

We claim:
1. In the polymerization of ethylene to form solid polymer, the improvement which comprises effecting the polymerization at a temperature within the range of 0 to 250° C. in the presence of a catalytic mixture initially consisting essentially of a transition metal in metallic form selected from the group consisting of titanium, vanadium, zirconium, chromium, and molybdenum, a second metal in metallic form selected from the group consisting of aluminum, zinc and magnesium and a halogen selected from the group consisting of chlorine, bromine and iodine, said catalytic mixture containing from 0.1 to 10 atoms of second metal per atom of transition metal and from 0.1 to 10 atoms of transition metal per mole of halogen.

2. The process according to claim 1 wherein the polymerization reaction is carried out in an inert liquid hydrocarbon vehicle.

3. In the polymerization of ethylene to form solid polymer, the improvement which comprises effecting the polymerization in an inert liquid aliphatic hydrocarbon vehicle at a temperature within the range of 25–175° C. and in the presence of a catalytic mixture initially consisting essentially of metallic aluminum, metallic titanium and chlorine, said catalytic mixture containing from 0.1 to 10 atoms of aluminum per atom of titanium and from 0.1 to 10 atoms of titanium per mole of chlorine.

4. The process according to claim 3 wherein the polymerization reaction is conducted at a pressure of at least 10 p.s.i.

5. As a composition of matter, a polymerization catalyst initially consisting essentially of a transition metal in metallic form selected from the group consisting of titanium, vanadium, zirconium, chromium and molybdenum, a second metal in metallic form selected from the group consisting of aluminum, zinc and magnesium and a halogen selected from the group consisting of chlorine, bromine, and iodine, said catalyst containing from 0.1 to 10 atoms of second metal per atom of transition metal and from 0.1 to 10 atoms of transition metal per mole of halogen.

6. As a composition of matter, a polymerization catalyst initially consisting essentially of metallic titanium, metallic aluminum, and iodine monochloride in a ratio of from 0.1 to 10 atoms of aluminum per atom of titanium and from 0.1 to 10 atoms of titanium per mole of iodine monochloride.

7. As a composition of matter a polymerization catalyst initially consisting essentially of metallic titanium, metallic aluminum and elemental chlorine in a ratio of from 0.1 to 10 atoms of aluminum per atom of titanium and from 0.1 to 10 atoms of titanium per mole of chlorine.

References Cited in the file of this patent

UNITED STATES PATENTS

| | | |
|---|---|---|
| 2,899,416 | Schreyer | Aug. 11, 1959 |

FOREIGN PATENTS

| | | |
|---|---|---|
| 874,215 | Germany | July 8, 1949 |
| 1,137,020 | France | Jan. 7, 1957 |

OTHER REFERENCES

Mellor: A Comprehensive Treatise on Inorganic and Theoretical Chemistry, Longmans, Green & Co., New York, N.Y. (1927), vol. 7, page 78.